United States Patent [19]

Molitor

[11] Patent Number: 4,529,032
[45] Date of Patent: Jul. 16, 1985

[54] METHOD OF AND APPARATUS FOR RECOVERY OF WASTE ENERGY

[75] Inventor: Victor D. Molitor, Denver, Colo.

[73] Assignee: Molitor Industries, Inc., Englewood, Colo.

[21] Appl. No.: 512,583

[22] Filed: Jul. 12, 1983

Related U.S. Application Data

[63] Continuation of Ser. No. 307,208, Sep. 30, 1981, abandoned, which is a continuation-in-part of Ser. No. 130,615, Mar. 17, 1980, abandoned, which is a continuation-in-part of Ser. No. 920,660, Jun. 30, 1978, abandoned.

[51] Int. Cl.³ .................................. F24H 1/00
[52] U.S. Cl. ............................ 165/13; 134/10; 134/104; 134/105; 134/107; 134/110; 165/47; 165/119; 165/165; 210/108; 210/411; 219/306; 219/312; 219/314
[58] Field of Search ............. 165/35, 66, 119, 13, 165/47, DIG. 12, 165; 134/25.1, 25.2, 10, 104, 56, 57, 58, 60, 100, 105, 107, 110; 210/108, 411; 219/306, 312, 314, 316

[56] References Cited

U.S. PATENT DOCUMENTS

| | | | |
|---|---|---|---|
| 1,605,961 | 11/1926 | Loew | 134/111 |
| 1,664,637 | 4/1928 | Merseles | 134/60 |
| 1,783,950 | 12/1930 | Boltz | 165/14 |
| 1,799,081 | 3/1931 | Blomqvist | 165/164 |
| 1,965,553 | 7/1934 | Lear | 165/165 |
| 2,028,471 | 1/1936 | Parent et al. | 165/143 |
| 2,133,481 | 10/1938 | Schroeder | 134/107 |
| 2,142,928 | 1/1939 | Walker | 134/113 |
| 2,190,072 | 2/1940 | Keys | 134/110 |
| 2,455,605 | 12/1948 | Olson | 165/66 |
| 2,718,481 | 9/1955 | Tuthill | 134/25 A |
| 3,022,638 | 2/1962 | Carswell | 62/505 |
| 3,112,263 | 11/1963 | Ellila | 210/411 |
| 3,332,478 | 7/1967 | Saunders | 165/163 |
| 3,357,567 | 12/1967 | Wabe | 210/411 |
| 3,542,592 | 11/1970 | Zweig | 134/32 |
| 3,938,533 | 2/1976 | Richard | 134/115 G |
| 3,946,802 | 3/1976 | Christenson | 165/35 |
| 4,011,101 | 3/1977 | Levenback | 134/10 |
| 4,073,663 | 2/1978 | Lundgren | 134/107 |
| 4,150,787 | 4/1979 | Braathen | 165/DIG. 12 X |
| 4,156,621 | 5/1979 | Andrews | 134/10 |
| 4,171,722 | 10/1979 | Huggins | 165/119 X |
| 4,256,176 | 3/1981 | Cohen | 165/76 |
| 4,313,491 | 2/1982 | Molitor | 165/163 X |

FOREIGN PATENT DOCUMENTS

2501165  7/1976  Fed. Rep. of Germany ... 165/DIG. 12

Primary Examiner—Albert W. Davis, Jr.
Attorney, Agent, or Firm—Horace B. Van Valkenburgh; Jerry W. Berkstresser

[57] ABSTRACT

A holding tank receives waste water from a dishwasher or laundry machine having a rinse cycle and at least one wash cycle. A pump moves the waste water through a heat exchanger at the same time that the rinse cycle requires hot water from a hot water heater. The cold water feed for the hot water heater is also passed in countercurrent heat exchange relationship with the waste water to provide warmed or heated makeup water at the same time that hot water is being withdrawn therefrom. The cooled waste water from the heat exchanger may be collected in a tank and supplied to any one or more of several additional devices, such as a water cooled refrigerant compressor, a grease extraction ventilator having water contact means, a waste food grinder, etc. The ventilator and compressor may also be placed in series, while the cooling water heated in the compressor is recirculated to the heat exchanger. The holding tank may be mounted directly beneath the dishwasher, or the holding tank and countercurrent heat exchanger may be placed in a common housing, with the holding tank beneath the heat exchanger and a pump to transfer the waste water from the holding tank to the appropriate tubes of the coils of the heat exchanger, from which waste water may be discharged into a discharge area adjacent the holding tank. A removable screen for the waste water may be provided above the holding tank in each instance. When a discharge area is adjacent the holding tank, the screen will be self-cleaning, due to flow of incoming waste water across the screen and into the discharge area, when the screen is occluded.

12 Claims, 16 Drawing Figures

METHOD OF AND APPARATUS FOR RECOVERY OF WASTE ENERGY

This application is a continuation of Ser. No. 307,208, filed Sept. 30, 1981 (now abandoned), in turn a continuation-in-part Ser. No. 130,615, filed Mar. 17, 1980 (now abandoned), in turn a continuation-in-part of Ser. No. 920,660, filed June 30, 1978 (now abandoned).

This invention relates to a method of and apparatus for the recovery of waste energy, particularly to a device, such as a dishwashing machine, wherein hot water, as for a rinse cycle, is supplied directly from a hot water heater, while waste water, such as at a lower temperature, is normally available, as from the wash cycle.

BACKGROUND OF THE INVENTION

The utilization of waste heat to preheat water supplied to a dishwasher is known, but has not been accomplished in the most effective manner. Thus, U.S. Pat. No. 3,789,860 discloses a dishwasher, the normal operation of which produces steam passing into a room in which the dishwasher is installed. Instead, the steam is collected in a hood and passed through a heat exchanger to preheat incoming water which along with the condensate from the steam, is supplied to a pre-rinse stage of the dishwasher. However, the hot water supplied for rinsing by a hot water heater, or similar source, is not affected, so that none of the recovered energy is utilized to reduce the fuel consumed by the hot water heater. U.S. Pat. No. 3,946,802 discloses a method of and apparatus for recovery of heat involving a supply pipe for supplying cold water to a water heater and a waste pipe which is supplied with waste water from different consumption points, including dishing machines, washing machines bath tubs, kitchen sewage and the like. Such waste water is directed to a collecting receptacle from which the waste water is either bypassed to a second receptacle or supplied to a concurrent flow heat exchanger in which the heat is inefficiently utilized, since the hottest waste water first transfers heat to the coldest incoming water. Temperature responsive elements control the bypass flow, so that if the waste water in the receptacle is at a lower temperature than the incoming water reaching the concurrent heat exchanger, the waste water will be bypassed to a second receptacle. There is a probability that this system will delay unduly in responding to a new supply of waste water, since the collecting receptacle has a central overflow and considerable waste water could be bypassed before the temperature sensor responds. The waste water bypassed to the second receptacle is, in turn, bypassed to the sewer or directed to a second concurrent flow heat exchanger, with the same loss of efficiency and probability of undue delay in response to incoming waste water.

The apparatus of the invention, for conserving energy for a device using a heated liquid from a liquid heater and producing waste liquid at a lower temperature than the heated liquid, may include a holding tank for collecting and releasing the waste liquid, an outlet adjacent the holding tank, an upright baffle separating the holding tank from the outlet, whereby waste liquid from the holding tank may overflow into the outlet, equipment including a conduit for transferring waste liquid from the holding tank to a heat exchanger to preheat incoming liquid for use in the device after heating in the liquid heater, equipment including a conduit for transferring the preheated liquid to the liquid heater for heating the preheated liquid to a temperature sufficient for use in the device and equipment including a conduit for transferring waste liquid from the heat exchanger to the outlet. The apparatus may further include a device, such as a dishwasher, using heated water from a hot water heater, a countercurrent heat exchanger for preheating the feed water to the hot water heater, a separate tank for collecting waste water discharged from the device and a pump for supplying the waste water to the heat exchanger at essentially the same time that the device requires hot water from the heater, as for rinsing. Thus, the incoming cold feed water is preheated at the time it is needed by the hot water heater. A dishwasher is ideally adapted for this usage, although the flow of collected waste water through the heat exchanger may be timed to coincide with hot water requirements of the device, or even another device operated in conjunction therewith in the case of devices other than a dishwasher. For a dishwasher, used waste water may be collected in a holding tank which is provided with a removable tray and a fixed screen for straining unwanted food or the like from the waste water. When the waste water is sufficiently electrically conductive, the holding tank may be provided with a series of electrodes, which turn the motor off when a low level of waste water in the holding tank is reached, turn the pump on when a higher level of waste water in the holding tank is reached and actuate an alarm, such as a light, buzzer, bell, etc., when an unduly high level of waste water in the tank is reached. The holding tank may instead be provided with a mechanical level sensor, such as a pivoted float mounted on a stem which actuates a switch for turning the pump motor on and off.

The heat exchanger is preferably of the type produced in accordance with my copending application Ser. No. 20,615 filed Mar. 15, 1979 now U.S. Pat. No. 4,451,960 entitled "Method of Producing Multiple Coil, Multiple Tube Heat Exchanger." As disclosed therein, each multiple tube row is wound outside the preceding row and the tubes for the respective fluid alternate, so that a tube carrying one fluid and passing in one direction with respect to the preferably hollow axis of the coil is interspaced in its own row with tubes carrying the other fluid in the opposite direction, as well as essentially alternating with tubes in the rows inside and outside of the aforesaid row. In addition, a heat conductive mastic is compressed between the tubes as they are formed into the spiral, generally circular rows.

The heat exchanger may be mounted at a position adjacent to or remote from the dishwasher, such as adjacent the hot water heater. The holding tank may be constructed so as to be beneath the dishwasher, or the holding tank and heat exchanger may be incorporated as a single unit, which may conveniently be mounted adjacent the dishwasher, such as beneath the dish table.

THE DRAWINGS

The foregoing features, as well as additional features, will become apparent from the following description taken in conjunction with the accompanying drawings, in which.

DESCRIPTION OF PREFERRED EMBODIMENT

Figure 1:
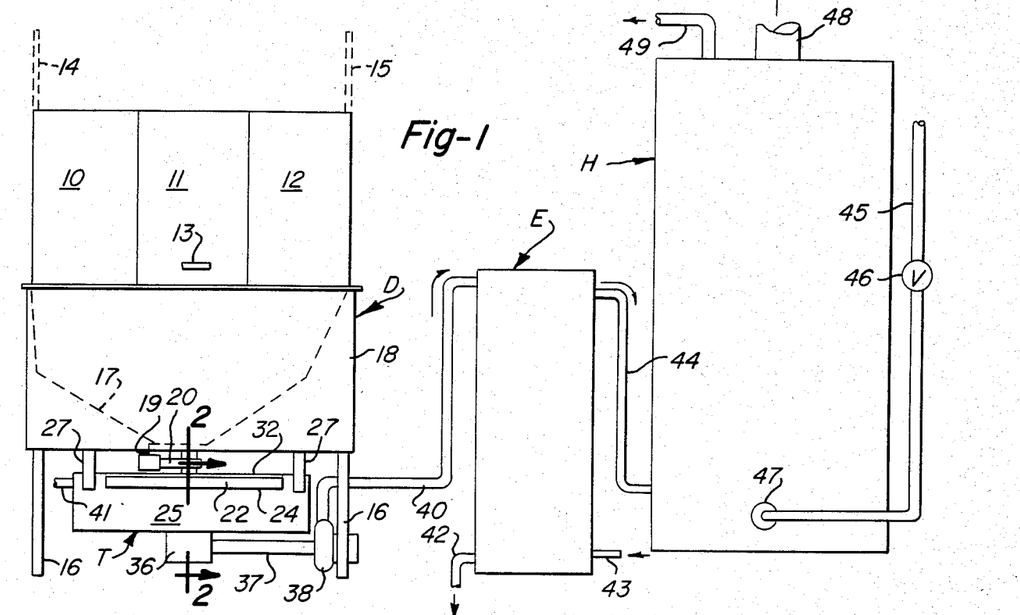
FIG. 1 is a diagram including a dishwasher, a heat exchanger and a hot water heater to which the principles of this invention have been applied.

As illustrated in FIG. 1, waste energy in the form of heat is recovered from a dishwasher D for circulation of the waste liquid from a washing or other cycle through a countercurrent heat exchanger E, rather than being discharged through a sewer drain. In the heat exchanger E, incoming cold water for the hot water heater H is preheated, with the then cooled waste dishwater being suitable for discharge through the drain. The dishwasher D may be of a dual type having a dishwashing section and a rinsing section separated by depending flexible strips and through which the dishes stacked on racks may be moved. The racks are movable along conventional supporting rods and are first moved into the dishwashing section for washing, and then into the rinse section for rinsing. These sections are conventional and the parts thereof are therefore not shown, but are behind upper panels 10, 11 and 12. The center panel 11 may be lifted for access to the central portion of the dishwashing space by means of a handle 13, while an entrance door 14 and an exit door 15 may be raised, as indicated by the dotted lines, to permit racks for dishes to be moved into the washing section and removed from the rinsing section, respectively. The dishwasher may be supported by legs 16.

The dishwasher illustrated is of a type in which the hot rinse water received from a suitable source of supply, such as a hot water heater, is discharged onto the dishes as through arcuate rotating arms having discharge holes or nozzles and normally located both above and below the dishes, as for one minute, then collected in a tank, such as tank 17 located behind a panel 18. When rinsing is completed and the rinse water has been collected in tank 17, a detergent is added to the still hot but somewhat cooled water in the tank, and this detergent water is pumped through similar rotating sprays for discharge onto the dishes in the washing section, from both above and below, and also recirculated by the pump from the tank through the sprays for an appropriate period of time, such as one minute. When washing is completed, the used wash water is drained through an outlet pipe 19, as for ten seconds, controlled by a solenoid valve 20. After a predetermined period of time, sufficient to enable the waste wash water in tank 17 to be drained, the solenoid valve 20 is automatically closed and the rinsing operation begun. Thus, the hot rinse water will collect again in tank 17, while after the detergent is added, the washing process may be repeated. While this system saves the heat remaining in the rinse water for use in washing, there is still a considerable temperature differential between the waste dishwater and the normal temperature of the cold water fed to the hot water heater, even when the so-called low temperature washing cycles are utilized. Thus, the dishwasher D may be such a low temperature washer in which a special detergent is utilized permitting the wash water to be at 130° F. or above and the rinse water to be at 140° F. or above, compared with the usual requirement of 140° to 150° F. for the wash water and 180° F. or above for the rinse water. Nevertheless, the method and apparatus of this invention recovers a very worthwhile portion of the energy normally lost, i.e. contained in the waste wash water.

Figure 3:
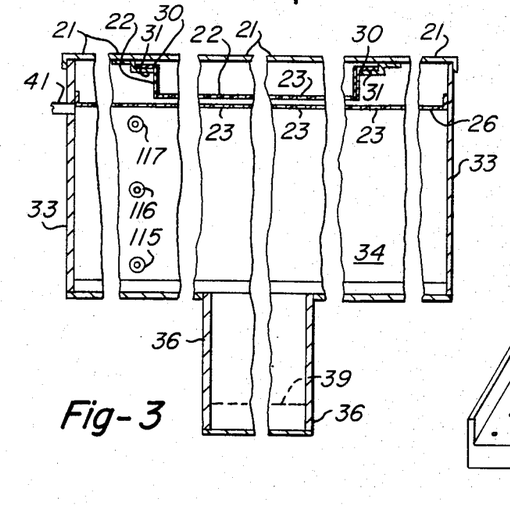
FIG. 3 is a condensed vertical section on an enlarged scale, taken along line 3—3 of FIG. 2.
Figure 4:
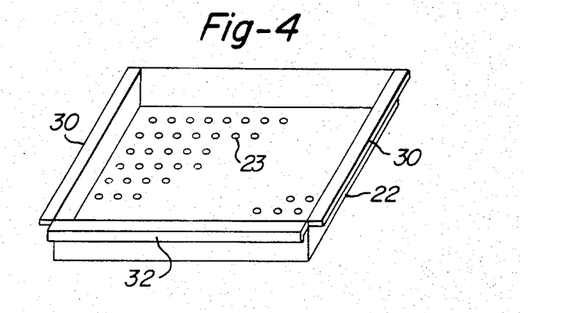
FIG. 4 is an enlarged perspective view of a removable screen tray, normally positioned in the upper portion of the holding tank.
Figure 5:
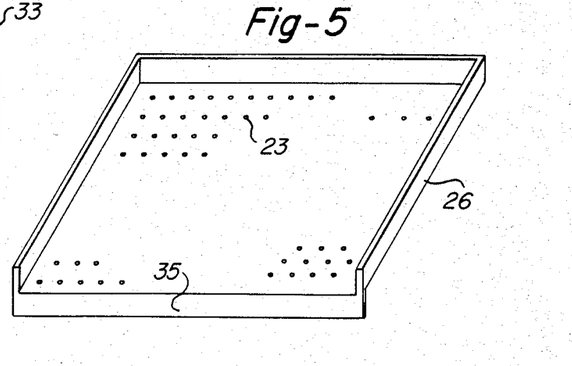
FIG. 5 is an enlarged perspective view of a fixed screen tray in the holding tank.

In accordance with this invention, instead of being thrown away, the waste dishwater is drained through outlet 19 into a holding tank T which has a capacity equal to the collection tank 17, so that the wash water may be passed through the heat exchanger E during the rinse period, i.e. when cold feed water is flowing to the hot water heater H, since hot water is discharged from the heater during the rinsing period. Of course, there may be other demands on the hot water heater, but in a restaurant, for instance, the dishwasher is the primary equipment user of the hot water, the hot water used for washing pans and for washing dishes being at times as much as 90% of the hot water produced by the hot water heater. The method of this invention is applicable to dishwashers in which the used rinse water, as well as used dishwater, would otherwise be discharged down a drain. In such an instance, both the used rinse water and the used dishwater may be collected in a holding tank corresponding to tank T. As the waste water passes through outlet 19 into holding tank T, which outlet is connected to the top wall 21 of the tank, it first encounters a rectangular screening tray 22, the bottom of which is provided with a series of holes 23, the size of which is exaggerated in FIG. 4 for purposes of illustration, but which prevent, as far as possible, the further flow of material which has been removed from the dishes in the washing operation. Tray 22 is removable through an opening 24 in the front wall 25 of the holding tank and, as a safeguard, a fixed screen 26 having similar holes 23 is mounted in the holding tank beneath the removable tray 22. The holding tank may be suspended from the underside of the dishwasher, as by straps 27 engaging rods 28 of FIG. 2. The sides of tray 22 are provided with lateral flanges 30 which are received, as in FIG. 3, by Z-shaped guides 31 attached to the underside of top 21 of the holding tank, while the front of tray 22 is provided with a handle 32. The fixed tray 26 may be provided with upstanding sides for attachment, as by welding, to the inside of the side walls 33 of the tank T, a corresponding upstanding rear wall for attachment to the rear wall 34 of the tank, and a depending front flange 35 for attachment to the front wall 25 of the tank. A sump 36 collects the waste wash water for discharge through an outlet pipe 37 which connects with the sump above the bottom thereof, so that no water will flow to a pump 38 below a predetermined height, such as indicated by the dotted line 39 of FIG. 3, to cause any material which may pass through holes 23 in tray 22 or screen 26 to collect in the bottom of the sump, for periodic removal. The sump is box-shaped and the warmed or somewhat hot waste water is discharged by the pump 38, during the time that hot rinse water is being supplied to the dishwasher, through a transfer pipe 40 which is connected to the discharge outlet of pump 38 and leads to the waste water inlet of heat exchanger E. An overflow pipe 41, leading to a drain, relieves excess waste water from the holding tank T.

After passage through countercurrent heat exchanger E, the waste water may be discharged to a drain through a heat exchange waste outlet 42. Also, during the time that cold makeup water is required by the hot water heater H, cold water flows, as indicated by the arrow, through a pipe 43 to the lower end of the heat exchanger and, after preheating by heat exchange, is discharged through an outlet pipe 44 which leads to the normal cold water inlet at the lower end of the hot water heater. Although heat may be supplied to the hot water heater by any type of fuel, including fuel oil or coal, it is illustrated as being supplied with heat through gas from a gas supply pipe 45 having a control valve 46 therein, and leading to a gas burner 47 adjacent the lower end of the hot water heater. The products of combustion are discharged upwardly through a flue 48, while the hot water, when called for, is discharged through an outlet pipe 49. Of course, hot water from outlet pipe 49 will be supplied to other equipment, such as lavatories, sinks and the like, in addition to the dishwasher, although the heat from the washing operation of the dishwasher is made available for preheating incoming cold water for the hot water heater during the time that the primary withdrawal is taking place, i.e. for rinsing. Nevertheless, even when no waste dishwater is being supplied to the heat exchanger E, there will still be some residual heat from the dishwasher remaining in the heat exchanger, in the event that other equipment requires hot water from the hot water heater, and there is necessarily an inflow of cold water. By this invention, not only may the fuel required by the hot water heater be reduced, but a saving in equipment may be made, since a smaller capacity heater may be utilized when the amount of B.T.U. required for heating the necessary hot water is reduced.

Figure 6:
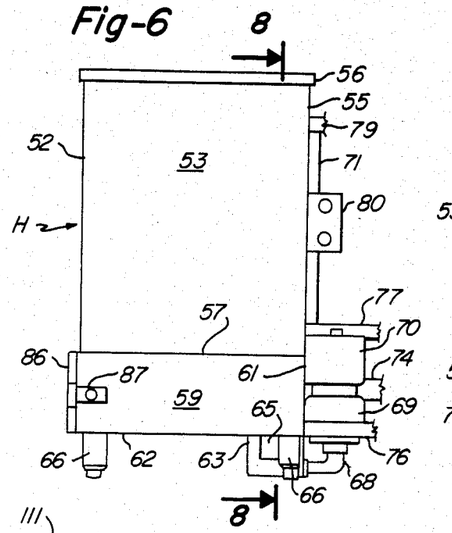
FIG. 6 is a side elevation of a heat exchanger and holding tank unit.
Figure 7:
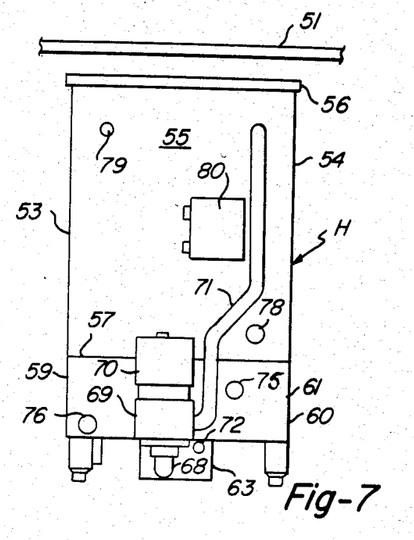
FIG. 7 is a rear elevation of the unit of FIG. 6.
Figure 8:
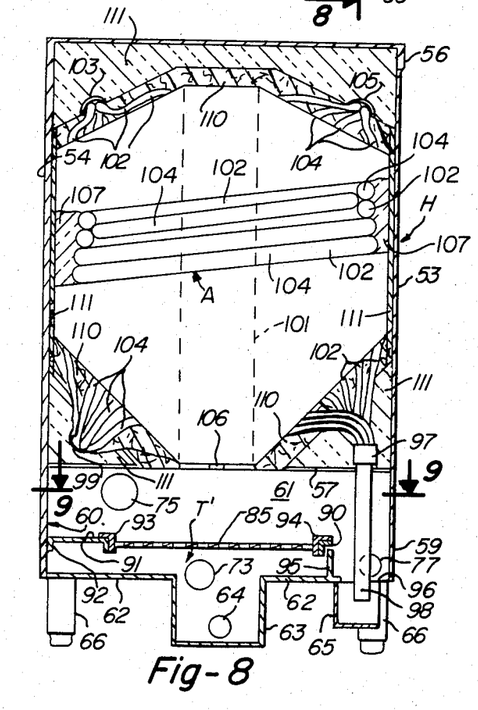
FIG. 8 is a vertical section, on a larger scale and taken along line 8—8 of FIG. 6 with a fragmentary showing of a coil assembly.

An alternative construction in which the holding tank and heat exchanger are combined in one unit, conveniently placeable adjacent the dishwasher, such as beneath the dish table thereof, is illustrated in FIGS. 6-10. This construction includes a housing H which, as in FIG. 7, may be placed beneath a dish table 51 of a conventional dishwasher. The upper portion of housing H encloses a coil assembly A, preferably constructed in accordance with U.S. Pat. No. 4,451,960 as indicated previously. The general shape of the coil assembly A is indicated diagrammatically in FIG. 8, being essentially a modified octagon. The smaller, lower portion of the housing H encloses a holding tank T', as also shown in FIG. 8. The upper portion of the housing H, as in FIGS. 6 and 7, includes a front wall 52, side walls 53 and 54 and a rear wall 55, with a top 56 adapted to close the upper end of the housing and a partition 57 separating the upper portion from the lower portion of the housing H. The tank T' is enclosed by a front wall 58, shown in FIGS. 9 and 10, and side walls 59, 60 and a rear wall 61, shown in FIGS. 6-9. The lower portion of tank T' is closed by a bottom wall 62 from which depends a rectangularly constructed sump 63 having an outlet 64, as well as a depending cylindrical cup 65, the purpose of which will be described later. The housing H may be supported by legs 66 of a height to space the lower edge of sump 63 appropriately above the floor or surface on which the unit rests.

A pipe 68, as in FIGS. 6 and 7, extends from the sump outlet 64 to a pump 69, which is mounted on the rear of the housing and is driven by an electric motor 70. From the pump 69, an outlet hose 71 leads to a waste liquid inlet for the heat exchanger coil assembly A, at the upper end of hose 71. The sump 63 is also provided with a float connection 72, as in FIG. 7, to which a conventional float 73 of FIG. 8 is pivotally connected, in order to turn the pump on whenever the level of waste water in tank T' reaches a desired higher level and to turn the pump off whenever the level of waste water reaches a lower level, such as down to a point within the sump, to prevent the sump outlet 64 from being uncovered and the pump thereby possibly lose its prime. A waste water hose 74 of FIG. 6 leading from the waste water discharge connection of the dishwasher connects with a waste water inlet 75 in rear wall 61 of the housing H, shown in FIG. 8, for discharging the waste water into the tank T', while a waste water hose 76 of FIGS. 6 and 7 leads from an outlet 77 at a lower point of the tank T', as in FIGS. 7 and 8. As will be evident, the heated waste water flows through one set of the dual alternating tubes of the heat exchanger, from the top to the bottom of the coils, while the incoming cold water to be preheated flows from the bottom to the top of the alternate tubes of the coils, from a lower inlet 78 to an upper outlet 79, as in FIGS. 6 and 7. An electrical control box 80 having conventional outlet connections, as shown, may be mounted on the upper, rear wall 55 of the housing H.

Figure 9:
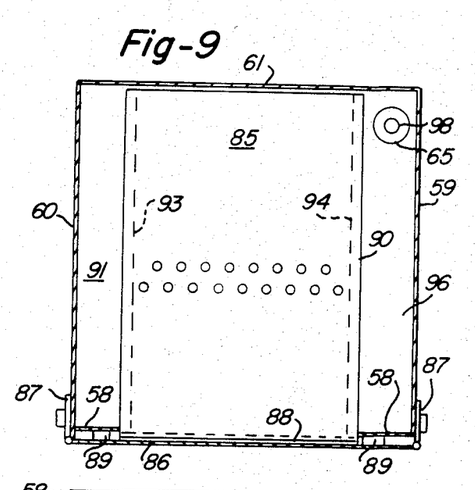
FIG. 9 is a horizontal section taken along line 9—9 of FIG. 8.
Figure 10:
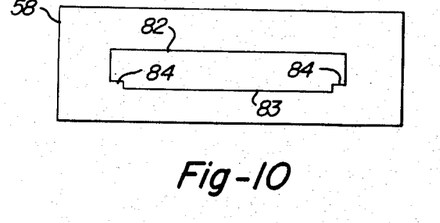
FIG. 10 is a front elevation, on the same scale as FIG. 8, of the front wall of the holding tank, which wall is normally covered by the front plate of a removable slide which carries a screen for the tank.

The front wall 58 which encloses tank T', as in FIG. 10, is provided with a generally rectangular opening 82 having a lower portion 83 of lesser width which provides ledges 84 to accommodate a slide which includes a screen 85 having holes of an appropriate diameter, as indicated in FIG. 9, to permit the waste water to flow through but to catch any food refuse or material of a larger size. A cover 86, to which screen 85 is attached, is in turn removably attached to the front wall by a latch 87 at each side. The slide is, of course, removable by unhooking the latches 87 and removing the front cover and the screen with it, then replacing the cover and screen, after the screen has been cleaned off. The screen 85 may be provided with an upstanding front flange 88, by which the screen may be removably attached to the cover in a conventional manner, as by a series of studs and nuts. The cover 86 is also provided with a rectangularly arranged gasket 89 which seals the cover against the front wall 58, around opening 82, as in FIG. 9, and may be formed of any suitable compressible gasket material to provide the desired seal.

As the screen is inserted, the opposite lower edges thereof are slid along the ledges 84 of opening 82 of FIG. 10, and thence at one side along the top flange of an angular guide 90 of FIG. 8 and at the opposite side along the top of an apron 91 having depending flanges 92, one of which may be attached to the side walls 60 and the other of which laterally engages a flange 93 depending from the underside of screen 85. A corresponding flange 94, depending from the underside of screen 85 and spaced from the opposite edge, is adapted to engage the side flange of guide angle which extends between and is attached to the front wall 58 and the rear wall 61 of tank T', as in FIG. 9. A baffle 95 beneath the outer, lower edge of guide angle 90 extends alongside the cup 65 and permits overflow of excess waste liquid from the area beneath screen 85 to flow into an outlet area 96 adjacent wall 59, as in FIG. 9, and thence flow through elongated 77 of FIG. 8 and through hose or pipe 76 to the sewer, or to another piece of equipment, as described later.

From a tubular waste outlet connector 97 adjacent the lower end of the coil assembly A, a pipe 98 extends downwardly and into the cup 65, so as to be immersed in the water in the cup and thereby prevent the pump 69 from losing its prime and also holding the waste water within the coils above until additional waste water is pushed through by the pump. By holding such waste water in the coils, any fresh water passing to the hot water heater, such as due to the requirement of some fixture other than the dishwasher, will tend to be preheated and additional heat to be extracted from the waste water. The prime of the pump is also maintained by the sump 63. A tubular connector 99 is also adjacent the lower end of coil assembly A, but receives incoming feed water.

The dual coils of the coil assembly A extend about a hollow center 101, while the lower ends of one series of tubes 102 extend into the tubular connector 97 and are both secured and sealed therein, as by soldering or brazing. Similarly, the upper ends of tubes 102 extend into and are secured and sealed within a tubular connector 103 for incoming waste water, while connector 103 is in turn connected with hose 71. The lower ends of the other series of tubes 104 similarly extend within and are secured and sealed within tubular connector 99, in turn connected to feed water inlet 78. The upper ends of tubes 104 are inserted within and sealed to a tubular connector 105 which, in turn, is connected to feed water outlet 79. Tubes 102 and 104 alternate within each row and in adjacent rows, with heat conductive mastic 107 between abutting tubes. The general shape of the coil assembly A is cylindrical, with a flat top and bottom at the ends of hollow center 101. The remainder of the top is generally conical, due to the winding of the alternating pairs of tubes 102 and 104, while the remainder of the lower end of the assembly is also conical, but at a sharper angle due to the lesser number of turns of the outer coils, in order to provide coils of as equal length as possible and therefore equalize the resistance to flow therethrough. Thus, both the inside coils and the outside coils, as well as those in between, should convey approximately the same amount of waste water or feed water, respectively. At the lower end of the hollow center 101 of the coil assembly is a drain hole 106 which permits liquid from any leaking tube, which will tend to seek a path through the heat conductive mastic, to drain into the tank T', rather than contaminating any incoming feed water. The outer surface of the coil assembly may be covered by a layer of insulation 110, such as fiberglass, to reduce radiation and conduction heat losses. The insulation 110 at the top may extend out to the upper connectors 103 and 105 but may be spaced from the lower connectors 97 and 99. The insulated coil assembly may be encased in a layer of foam insulation 111, such as polyurethane foam, which has two purposes. The first is, of course, to act as insulation, and the second is to retain the coil assembly in position within the housing H, to prevent breakage of any of the coil tubes during shipping or installation.

One advantage of the outlet area 96 is that it tends to render the screen 85 self-cleaning, since the waste inlet 75 is at the opposite side of the tank from the outlet area and if the screen becomes clogged, the waste water will flow across the screen to the outlet or discharge area and tend to carry with it the material which clogs the screen. A similar result occurs in the event that there is a malfunction of the float 73 or the pump 69, so that the waste water is not removed from the tank on one cycle and the level of water in the tank rises over the top of the baffle 95. In such an event, water which continues to pass through the screen will tend to overflow the baffle, but for complete discharge of the waste water, this overflow would be insufficient, so that the excess will flow across the screen and into the discharge area 96, tending to carry with it any material collected on the screen. Such material, along with the waste water, will be discharged through the waste water outlet 77. Thus, the discharge area 96 eliminates the necessity for a special device for sounding an alarm, as described later in connection with the tank T of FIG. 1.

Direct control of the motor 69 by a conventional switch associated with the float 73, as described, is particularly adaptable for use with a dishwasher whose rinse cycle begins concurrently with or shortly after the discharge of the waste water from the wash cycle. However, when the discharge of waste water is not closely correlated with the rinse cycle, the switch control actuated for the float 73 may be placed in series with a switch controlled by the timer of the dishwasher, so that when the rinse cycle is started, the waste water will be pumped through the heat exchanger and thereby preheat the incoming fresh water, normally cool or cold, which replaces the hot water withdrawn for the rinse cycle. Also, when the rinse water, as well as the used dishwater, is discharged as waste water, the dishwater and the rinse water may be saved for countercurrent heat exchange with the incoming fresh water on the next rinse cycle and the pump motor controlled by a switch which, in turn, is controlled by the timer or other appropriate control mechanism of the dishwasher.

Figure 2:
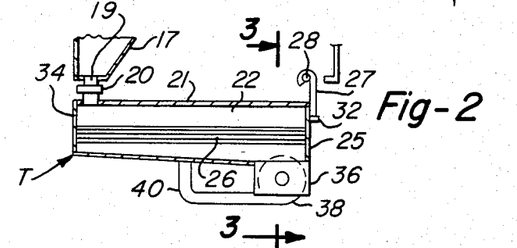
FIG. 2 is a vertical section taken along line 2—2 of FIG. 1 through a holding tank mounted beneath the dishwasher.
Figure 11:
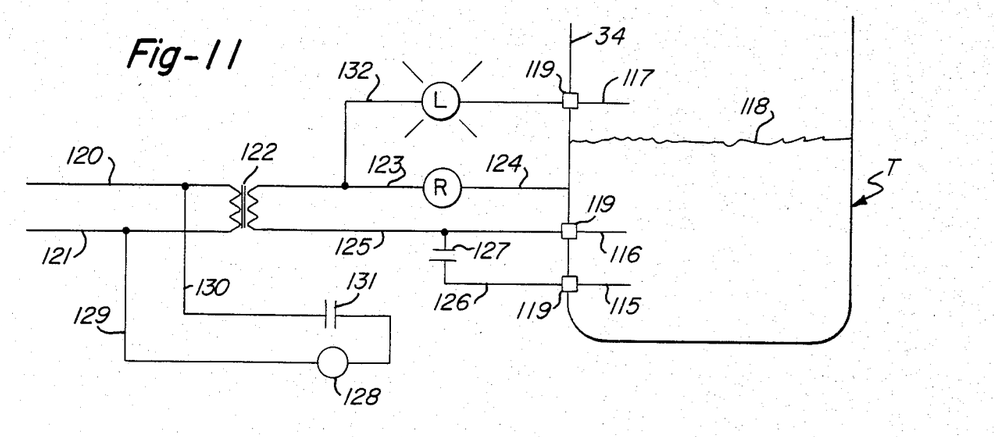
FIG. 11 is a diagrammatic illustration of a pump control and alarm circuit having electrodes installed in the holding tank.

The pump control and alarm circuit of FIG. 11 is adapted to control the operation of pump 38 of FIGS. 1 and 2 through a low level electrode 115 and a high level electrode 116. This circuit also includes a safety electrode 117 which is disposed above the normal water level 118 in the tank T. The electrodes 115, 116 and 117 each extend through the rear wall 34 of the tank T, at the positions indicated in FIG. 3. Each electrode may pass through a compression fitting 119 installed in the wall of the tank T, which not only insulates the electrode, but also prevents leakage of waste water around it. Briefly, the pump 38 is turned on if the water reaches the level of electrode 116 and is turned off when it reaches the level of electrode 115. In the event that the level of waste water in the tank T becomes unduly high, indicating that the pump is not functioning or some other problem exists, the waste water will cover the alarm electrode 117 and actuate an alarm, such as a light L or a bell, buzzer or any other type of suitable signaling device.

Power is supplied to the circuit through electrical leads 120 and 121, such as 110 volts, to a transformer 122 which reduces the voltage to 20 to 40 volts. From one side of the transformer 122, a lead 123 extends to a relay R, with a ground wire 124 being attached to the tank. On the opposite side of transformer 122, a lead 125 extends to the high level electrode 116, while a branch lead 126, having normally open holding contacts 127 therein, extends to low level electrode 115. The motor 128, for pump 38 of FIGS. 1 and 2, is supplied with electricity, as at 110 volts, through a pair of leads 129 and 130, with contacts 131 interposed in lead 130. Assuming that the holding tank T has been essentially empty but begins to fill at the end of a wash cycle, when the level of water reaches the high level electrode 116, the circuit through relay R will be closed through lead 125 and ground wire 124. The relay will then close both normally open contacts 127 and 131, so that pump motor 128 will be started and the relay circuit will remain closed as long as low level electrode 115 is immersed. Thus, as long as the level of waste water in the tank remains above electrode 116 or below electrode 117 but not below lower electrode 115, the motor 128 will remain running. However, as soon as the level drops below the lower electrode, the circuit through relay R will be broken, the relay will be deenergized and each of contacts 127 and 131 will become open, thereby causing motor 128 to be stopped. Of course, as soon as the level again reaches upper electrode 116, the pump motor 128 will again be started. Normally, a single emptying of a dishwater washing tank, which will soon cause the pump motor to be started, will be exhausted when the waster water level falls past the lower electrode. A branch lead 132 extends from lead 123 through light L to alarm electrode 117, which will operate in the manner indicated previously.

Figure 12:
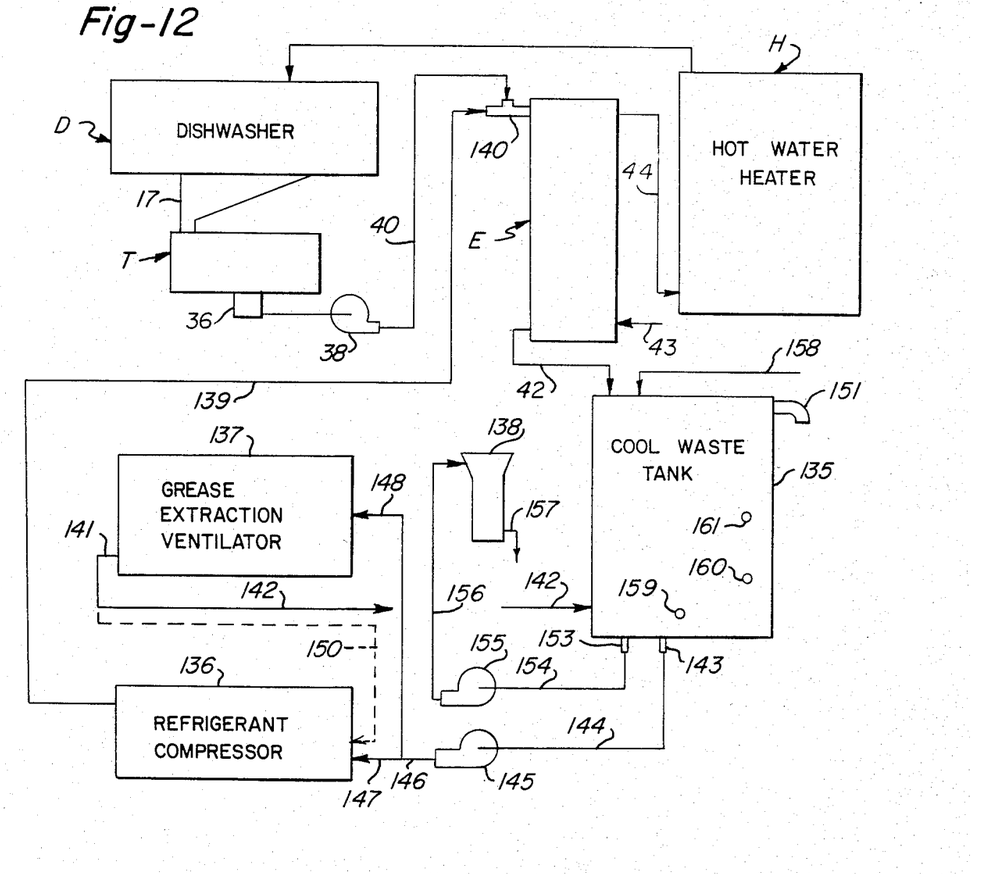
FIG. 12 is a diagram of a system alternative to that of FIG. 1, which may include also a water cooled refrigerant compressor, a grease extraction ventilator and a waste food grinder.

In the alternative arrangement of FIG. 12, the dishwasher D, holding tank T, heat exchanger E and hot water heater H are utilized in essentially the same manner as before, except that the cooled water from heat exchanger E may flow, as through discharge pipe 42, to a cooled waste liquid collection tank 135, from which it may be supplied to a second device, such as a liquid cooled refrigerant compressor 136 and/or a third device, such as a grease extraction ventilator 137 having water contact means, such as a water bath, and/or a fourth device, such as a waste food grinder 138. The waste liquid, heated through cooling the compressor 136, may be recirculated to the heat exchanger, as through a pipe 139 which leads to a tee 140, which also receives heated waste liquid from holding tank T, as described previously, through pipe 40. After flow through grease extraction ventilator 137, the waste liquid, which tends to be cooled in the ventilator, may be recirculated to the waste liquid collection tank 135, as from an outlet 141 through a pipe 142, or the ventilator and the compressor may be connected in series, as described below. Thus, cooled waste water from tank 135 may be discharged through a first outlet 143, as on the underside of tank 135, and a pipe 144 to a pump 145 which supplies, through a pipe 146 and a branch pipe 147, the water cooling passages of the refrigerant compressor 136. Normally, water cooled refrigerant compressors require refrigeration equipment to cool water or an undue volume of fresh, cooled water, since the water discharged from the cooling passages of a water cooled refrigerant compressor may reach temperatures on the order of 100° to 130° F., often depending on the time of year. However, the supply of waste dishwater which can pass through heat exchanger E is normally cooled by heat exchange with the incoming cold water for the hot water heater and is thus suitable for cooling a water cooled refrigerant compressor. The presence of detergent in the waste dishwater is of advantage in maintaining the inside surfaces of the water cooling passages of the refrigerant compressor in a clean condition, so that no problem of this nature can be expected in using waste water from this source. As indicated previously, the then heated waste water from the refrigerant compressor is conveyed by return line 139 to tee 140 for recirculation through the heat exchanger and further cooling therein, then collection in the cooled waste water tank 135.

Pump 145 may also supply cooled water, as through a branch pipe 148, to grease extraction ventilator 137 having water contact means, such as a water bath against which hot gases, fumes, grease, etc. from cooking equipment, usually mixed with air, are directed, as in U.S. Pat. No. 3,841,062. Or, the grease extraction ventilator may be provided with other types of water contact means, such as water sprays through which the hot gases, fumes, grease, etc., again usually mixed with air, are directed or pulled. The waste dishwater from a dishwasher is particularly advantageous for use in a grease extraction ventilator having water contact means, since the detergent contained in the waste dishwater tends to dissolve the grease and maintain the surfaces within the ventilator in a clean condition. In water spray ventilators, it is normally necessary to clean the surfaces periodically, as by special sprays of hot water containing detergent, while water bath grease extraction ventilators normally require either periodic cleaning or the addition of detergent to the water bath at regular intervals. A grease extraction ventilator with water contact means is also advantageous for use in conjunction with the cooled waste water tank 135, since the flow of hot gases, fumes, grease, etc., when mixed with air, has a tendency to cool the water through evaporation, even though the hot gases may not be cooled to a similar extent. Thus, the waste dishwater supplied to water contact ventilator 137 may instead be transferred directly to the cooling compartment of refrigerant compressor 136, as through a pipe 150, indicated by a dotted line. As before, the waste water heated by refrigerant compressor 136 may be recirculated through the heat exchanger by pipe 139. However, for such a connection, branch pipe 147 leading to compressor 136 may be omitted, as well as pipe 142 between outlet 141 and waste tank 135. When the waste water supplied to compressor 136 is recirculated through heat exchanger E, it, of course, is returned to tank 135, to which the waste water from ventilator 137 may be returned. Also, when the ventilator and compressor are placed in series, as through pipe 150, all of the waste water so circulated will be returned to tank 135. Thus, there may tend to be an over accumulation of waste water in tank 135, which may be relieved through an overflow pipe 151.

Some of the excess of waste water may be used to supply waste food grinder 138 through a second outlet 153, as also on the underside of cooled waste water tank 135, through a pipe 154 to a pump 155, from which a pipe 156 leads to the waste food grinder 138 having a discharge line 157 through which the ground food waste and the waste water flows to a sewer or the like. The cooled waste water is ideal for use in the food grinder, since it not only lubricates the bearings used in such equipment but also congeals grease and reduces the possibility of it clogging a drain pipe, as by deposition further downstream.

A cool water makeup line 158 may be utilized to add cool water to tank 135, such as when the waste food grinder requires more liquid than the dishwasher may be supply, or when there is normally no incoming feed water for the hot water heater H, and thus no cooling of the waste water, such as recirculated from the compressor, passing through the heat exchanger E. Thus, during periods when a restaurant, for instance, is not in operation and no hot water is being used, particularly by the dishwasher, but the refrigerant compressors are still in operation due to heat leakage from the refrigerator spaces, the makeup line 158 may be used to maintain a sufficiently low temperature of the waste water in cool waste tank 135. Thus, if there is sufficient cool waste water in the tank to cool the refrigerant compressors adequately during the off periods of other equipment, particularly a dishwasher, the makeup line will not be used. If desired, a conventional temperature responsive element 159 may extend into the waste tank adjacent the outlet 143 to turn on line 158, by turning on a pump or valve (not shown) in a conventional manner, to offset heating of the water by the refrigerant compressor, whenever the temperature of the waste water in the tank rises to reach a predetermined degree.

The valve for makeup line 158 may also be controlled by a low level electrode 160 and a higher level electrode 161 when, as indicated above, the waste food grinder 138 requires more waste water than the dishwasher supplies. Although it would be expected that pre-rinsing dishes at the waste food grinder would take place substantially contemporaneously with the washing of the dishes, it may sometimes happen that dishes are pre-rinsed and stacked for a period of time, such as 15 minutes, and pre-rinsing then discontinued and the dishes washed for the next period of time, such as 15 minutes. The electrodes 160 and 161 may be connected in a circuit, so that if the level of waste water in tank 135 falls below low level electrode 160, the pump or valve producing flow through makeup line 158 will be turned on, but as soon as the level of liquid reaches higher level electrode 161, the pump or valve will be turned off. Electrodes 160 and 161 may be similar to electrodes 115 and 116 of FIG. 10 and connected in a relay circuit, but in a different but conventional manner, i.e. electrode 160 breaks a circuit to open the valve and electrode 161 closes the circuit to close the valve.

Although the application of the method and apparatus of this invention to a dishwasher has been illustrated and described, it will be understood that the method and apparatus may be utilized in connection with other types of devices which produce waste water having a sufficient heat content and require hot water from a hot water heater. Thus, the method and apparatus of this invention may be utilized in recovering energy from laundry machines, such as the Milnor washer extractors manufactured by Pellerin Milnor Corporation of Kenner, Louisiana. Such machines include smaller models having capacities of 35, 50 or 60 pounds dry weight of laundry, while others have capacities of 75, 125, 135 and 200 pounds. A model which has a capacity of 275 pounds dry weight laundry tilts for automatic unloading and is loaded automatically by a chute or band system. Other models have capacities of 350, 450 and 600 pounds and are provided with dual pockets for easier loading and unloading, having an overall height of 94 to 105 inches. Other models in 135, 200, 300, 350 and 600 pound sizes are adapted for hospital use, i.e. they are loaded from one end in one room and unloaded in another room from the opposite end, while all air flow through the washer is from the sterile unloading room to the non-sterile loading room.

Figures 13, 15, 16:
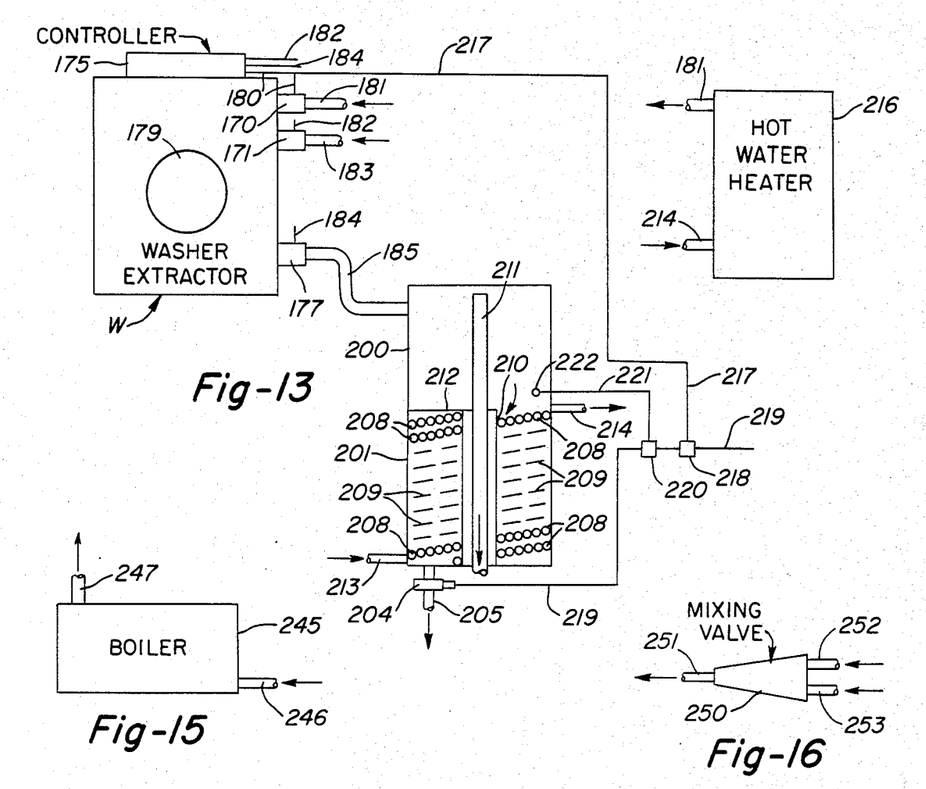
FIG. 13 is an essentially diagrammatic elevation of a laundry machine to which the principles of this invention have been applied.
FIG. 15 is a diagrammatic elevation of a boiler which may supply steam to the laundry machine of FIG. 14.
FIG. 16 is a diagram of a mixing valve for producing hot water at a desired temperature from cold water and water heated to a higher temperature than normal for hot water for the laundry machine.
Figure 14:
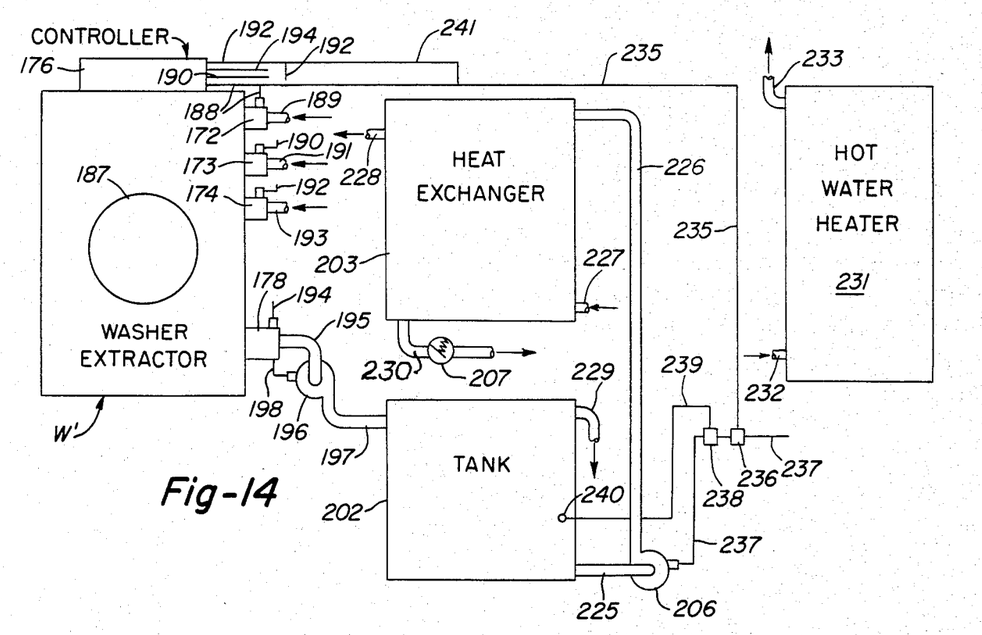
FIG. 14 is a similar essentially diagrammatic elevation showing a different style of laundry machine.

In general, the smaller models of the Milnor washer extractor, exemplified by the washer extractor W of FIG. 13, have solenoid operated water inlet valves, exemplified by hot water valve 170 and cold water valve 171, while the larger models, exemplified by the washer extractor W' of FIG. 14, have electrically controlled air operated inlet valves, exemplified by hot water valve 172, cold water valve 173 and steam valve 174. All of the models are equipped with a controller, exemplified by the controller 175 of FIG. 13 and the controller 176 of FIG. 14, each of which includes a timer and replaceable plastic charts (not shown) for controlling the wash, rinse and extraction cycles, as well as the automatic injection of soap, bleach, bluing and the like, but are subject to manual override. Generally, these controls provide at least three principal temperatures, i.e. hot, cold and a mixture, for both the wash and rinse cycles, as well as two additional temperatures which may be set manually. All of the models are also equipped with a drain valve, exemplified by the drain valve 177 of FIG. 13 and the drain valve 178 of FIG. 14, the former being solenoid operated and the latter air actuated but electrically controlled, although the former may also be similarly air actuated. Some models, such as those for hospital use, have steam inlet valves, exemplified by valve 174 of FIG. 14, in addition to the hot water inlet valves, as where sterilization of the laundry is important. Other models have special "cool down" controls to reduce the temperature of the laundry load gradually and thereby avoid thermal shock of permanent press fabrics. In addition to the parts previously referred to, the washer extractor W of FIG. 13 includes a loading and unloading door 179, an electrical lead 180 which extends from the controller 175 to the solenoid operated hot water inlet valve 170 to which hot water is supplied by a pipe 181, an electrical lead 182 which extends from the controller to solenoid operated cold water inlet valve 171 to which cold water is supplied by a pipe 183 and an electrical lead 184 which extends to the solenoid operated drain valve 177, which discharges through an outlet pipe 185. Valve 177 may, as indicated, be air operated but electrically controlled. Somewhat similarly, the washer extractor W' of FIG. 14 includes a loading and unloading door 187, an electrical lead 188 extending from the controller to the air operated but electrically controlled hot water inlet valve 172 to which hot water is supplied by a pipe 189, an electrical lead 190 extending to the cold water inlet valve 173 to which cold water is supplied by a pipe 191, an electrical lead 192 extending from the controller to the steam inlet valve 174 to which steam is supplied by a pipe 193, and an electrical lead 194 extending from the controller to the drain valve 178, which discharges through an outlet pipe 195 to a pump 196 having an outlet pipe 197. The purpose of pump 196 is to insure that the waste water will be drained from the washer extractor at a maximum rate, while pump 196 may be controlled by a branch lead 198 of lead 194 so that pump 196 will be started when drain valve 178 is opened.

The method and apparatus of this invention may be applied to such laundry machines by collecting waste liquid, as at different times from the wash cycle and rinse cycle, to a tank 200 of FIG. 13, which is associated with a heat exchanger 201, through pipe 185 from drain valve 177, or to a tank 202 of FIG. 14, which is associated with a heat exchanger 203, through a pipe 197 from pump 196. Such waste liquid is passed in countercurrent heat exchange with the normally cool, incoming water supplied to the heater at a time when the hot water inlet valves and/or steam inlet valves are open for the succeeding cycle. When the waste water from the wash cycle is collected, a relatively small amount of time may elapse between the collection and passage of the waste water to heat exchange, corresponding to the time between the end of the wash cycle and the beginning of the rinse cycle. However, when the waste water is collected from the rinse cycle, considerable time may elapse, including the time necessary for completion of extraction, unloading and reloading the machine, until the hot water and/or steam valves are open for the next wash cycle. This is accomplished in FIG. 13 by gravity flow of waste liquid collected in tank 200 through countercurrent heat exchanger 201 by opening of a valve 204 which controls flow through an outlet pipe 205. In FIG. 13, tank 200 is above heat exchanger 201, but this requires an installation disposed below the floor level of the washer extractor W a distance equal to the combined height of tank 200 and heat exchanger 201. A similar installation may be utilized for the washer extractor of FIG. 14, although the tank 202 is shown as below the floor level of washer extractor W', with heat exchanger 203 above the floor level to minimize the space requirements below floor level occupied by the equipment. Since pump 196 discharges waste water as rapidly as possible, tank 202 may be mounted above floor level, but the construction shown has the advantage that the washer may still be drained in the event of a malfunction of pump 196. A pump 206 transfers waste water from tank 202 to heat exchanger 203, while flow from the heat exchanger is controlled by a spring pressed check valve 207, which will open when pump 206 is operating but otherwise remains closed.

In accordance with this invention, the tank 200 collects waste liquid and feeds it through the heat exchanger when a valve 204 in an outlet pipe 205 is opened for discharge of the waste water after passage through the heat exchanger. In the case of the tank 202 and the heat exchanger 203, an appropriately controlled pump 206 is adapted to transfer the waste liquid from the tank to the heat exchanger, from which it may be discharged through a spring pressed check valve 207 which will limit flow to those times during which the pump 206 is on.

The heat exchanger 201 of FIG. 13, as well as the heat exchanger 203 of FIG. 14, may be formed in the manner disclosed in U.S. Pat. No. 4,313,491, based on a division of my aforesaid application Ser. No. 920,660, as illustrated generally in FIG. 13, which shows spiral tubes 208 wound in pressure abutting relationship in spiral turns, also indicated by dash lines 209, with each spiral turn spaced from the turn above and below, such that the cross sectional area of the spiral passage between the tubes is a predetermined relationship to the cross section of the tubes, such as disclosed in said patent. As indicated by the arrow of FIG. 13 in tank 200, when the lower valve 204 is open, waste water from the tank will flow into the top of the spiral passage and proceed spirally and downwardly between the tubes until the area above discharge valve 204 is reached. The tubes are wound about a central, hollow cylinder 210 through which an overflow pipe 211 extends upwardly to a point adjacent the top of the tank, preferably above the inlet pipe 185, so that if a stoppage of the heat exchanger or failure of the control equipment occurs, the excess waste water will be discharged through the overflow pipe. A plate 212 forms the bottom of tank 200, except at the area of the intake to the spiral passage between the tubes 208. Also, plate 212 surrounds overflow pipe 211 and seals the top of the hollow, central cyclinder 210. A feed water inlet 213 is connected to the tubes 208 at the bottom thereof, while a feed water outlet 214 is connected to the tubes 208 at the top thereof, such as each through a suitable header, as disclosed in the aforesaid patent.

The feed water outlet pipe 214 normally connects with the inlet of a hot water heater 216, from which the heated water is supplied by pipe 181 to the hot water valve 170. In accordance with this invention, a branch lead 217 extends from the control lead 180 for the hot water valve 170 to a switch 218 in the control line 219 for the valve 204, so that the drain valve for the tank will not be opened until hot water is being supplied to the washer extractor. A second control switch 220 may be interposed in the control line 219 and actuated through a lead 221 from a sensor 222 in the tank, to insure that water will not be drained from the lower end of the heat exchanger and water from the tank flow into the upper end of the heat exchanger, unless there is an adequate supply of waste water in the tank. The capacity of the tank 200 may be determined by the normal capacity of the washer extractor, preferably with an additional capacity, such as to accommodate twice the washer capacity.

In the alternative embodiment of FIG. 14, an inlet pipe 225 for pump 206 is connected to the lower end of tank 202, while pump 206 transfers waste water from the tank to the heat exchanger through a pipe 226. Tank 202 is provided with an overflow pipe 229, preferably above the level of inlet pipe 197, while an outlet pipe 230 extends from the lower end of the heat exchanger, in which pipe spring pressed check valve 207 is interposed. The heat exchanger is provided with a lower feed water inlet pipe 227 and an upper feed water outlet pipe 228, which would normally be connected to a hot water heater 231, as at an inlet 232. The outlet 233 of the hot water heater may be connected to the pipe 189 for supplying hot water to the washer through valve 172, although it may instead be connected to the mixing valve of FIG. 16. To insure that pump 206 is operating when hot water valve 172 is open, a branch lead 235 of the control lead 188 for valve 172 is connected to a switch 236 in control line 237 for motor 206, so that switch 236 must be closed before motor 206 will start. A second switch 238 may be interposed in pump control line 237, being connected by a lead 239 to a sensor 240, which assures that there will be an adequate supply of waste water in the tank before pump 206 is started. Also, to insure that pump 206 will be operated when the steam valve 173 is open, a branch lead 241 extends from the control lead 192 for the steam valve to a junction with branch lead 235, as shown.

For supplying steam to the steam valve 174 of FIG. 14, a boiler 245 of FIG. 15 may be utilized, having an inlet pipe 246, such as supplied with heated hot water from outlet pipe 233 of the hot water heater and having a steam outlet pipe 247 which supplies pipe 193 for the steam valve 174. It will be noted that one boiler and one hot water heater may supply a number of washer extractors, but the method and apparatus of this invention insures that whenever there is a flow to the washer extractor, either through the hot water valve heater or through the steam valve, the heat exchanger will be placed in circulation by countercurrent passage of the incoming feed water with respect to the waste water. For instance, a number of heat exchangers may supply one hot water heater, which, in turn, supplies one boiler, with each heat exchanger being controlled by the corresponding washer extractor. However, irrespective of which washer extractor is drawing hot water from the hot water heater, either directly or through the steam boiler, or both, the feed water flow through the corresponding heat exchanger provides a corresponding amount of makeup water for the hot water heater.

There are numerous instances in which the hot water heater may be operated at a higher temperature and the hot water for the washer extractor reduced in temperature by mixture with feed water, as in the case of the mixing valve 250 of FIG. 16, which is conventionally temperature controlled, so that the desired temperature of water at the outlet 251 is maintained. When such mixing valve is utilized, the outlet 233 of the hot water heater may be connected to the hot water inlet 252 of the mixing valve, but the heat exchanger outlet pipe, in addition to being connected to the hot water heater inlet, also has a branch connected to the cold water inlet 253 of the mixing valve. This reduces the amount of hot water required from the hot water heater and also produces a highly desirable result, i.e. the flow of incoming feed water through pipe 227 of the heat exchanger will be proportional to the amount of water being used when the hot water valve 172 is in operation, since the entire supply to the mixing valve is provided in part directly from the heat exchanger and the remainder from the hot water heater, which in turn is supplied by the heat exchanger. Thus, the amount of feed water supplied from the heat exchanger will correspond to the amount of water supplied by the mixing valve to the hot water valve 172.

Although the application of the method and apparatus of this invention to a refrigerant compressor, a grease extraction ventilator having water contact means and/or a waste food grinder have been illustrated and described, it will be understood that the method and apparatus may be utilized with other types of devices, particularly those having similar cooling requirements or liquid requirements. Similarly, the apparatus for recovery of waste energy of this invention may be applied to the different types of devices referred to above, while embodiments other than those illustrated and described may exist. It will further be understood that various changes may be made in the method and apparatus for waste energy recovery, without departing from the spirit and scope of this invention.

What is claimed is:

1. Apparatus for energy recovery for a device using heated liquid from a liquid heater and producing waste liquid, comprising:
   a holding tank for collecting and releasing said waste liquid;
   an elongated outlet, adjacent said holding tank and into which waste liquid from said holding tank may overflow;
   upright baffle means separating said holding tank from said outlet;
   a generally horizontal screen disposed above the normal liquid level in said holding tank through which waste liquid normally flows but adapted to permit waste liquid to overflow into said outlet to carry material into said outlet which retards flow through said screen an inlet for said waste liquid generally opposite to said outlet so that liquid from said inlet will carry material clogging said screen into said outlet;
   means for transferring waste liquid from said holding tank to a heat exchanger to preheat incoming liquid for use in said device;
   means for transferring said preheated liquid to means for heating said preheated liquid to a temperature sufficient for use in said device; and
   means for transferring waste liquid from said heat exchanger to an outlet.

2. Apparatus as defined in claim 1, wherein:
   said screen is mounted on a removable tray.

3. Apparatus as defined in claim 1, wherein:
   said screen is positioned to provide space above said baffle so that said holding tank may overflow into said outlet.

4. Apparatus as defined in claim 1, including:
   a pump for transferring waste liquid from said holding tank to said heat exchanger; and
   a sump depending from the bottom of said holding tank, said sump having inlet means for said pump.

5. Apparatus as defined in claim 1, wherein:
   said heat exchanger has upright spiral coils for waste liquid and feed liquid in adjacent relationship;
   said means for transferring waste liquid from said holding tank is connected with the upper end of said waste liquid coil;
   housing means encloses said heat exchanger and said holding tank, with said holding tank and outlet being below said heat exchanger; and
   a waste liquid conduit extends within said housing from said heat exchanger to said outlet adjacent holding tank.

6. Apparatus as defined in claim 5, including:
   a depending cup below said outlet, said conduit extending downwardly to a point within said cup.

7. An apparatus for energy recovery for a dishwasher using heated water from a hot water heater, said dishwasher having separate rinse and wash cycles with said rinse cycle receiving heated water from said hot water heater and said wash cycle producing waste water, comprising:
   a holding tank for collecting and releasing said waste water, said holding tank having a capacity generally equal to the amount of waste water received from said wash cycle;
   means for transferring waste water from said holding tank to a heat exchanger to preheat incoming water for use in said dishwasher;
   means including pump means for transferring said preheated water directly to said hot water heater for heating said preheated water to a temperature sufficient for use in said dishwasher;

means for controlling the transfer of waste water to said heat exchanger at a time corresponding to the flow of heated water from said hot water heater to said dishwasher, said control means being responsive to the level of waste water in said holding tank reaching a predetermined level for starting said pump and a predetermined lower level for stopping said pump when said waste water has been drawn down to said lower level; and means for transferring waste water from said heat exchanger to an outlet.

8. Apparatus as defined in claim 7, wherein said control means includes:

a float mounted in said holding tank and responsive to the level of waste water therein.

9. Apparatus as defined in claim 7, wherein:

said holding tank is disposed beneath a portion of said dishwasher.

10. Apparatus as defined in claim 7 wherein:

said control means is operative when waste water in said holding tank reaches a predetermined higher level to stop said pump and terminate transfer of waste water to said heat exchanger.

11. Apparatus as defined in claim 7, wherein said control means comprises:

a pair of electrodes extending into said holding tank at higher and lower positions for respective initiating and terminating transfer of waste water to said heat exchanger.

12. Apparatus for energy recovery for a device using heated liquid form a liquid heater intermittently and producing waste liquid at a lower temperature than said heated liquid, including a holding tank for collecting and releasing said waste liquid, means for controlling the release of said waste liquid to effect release thereof during a selected period, a pump transferring said waste liquid to a countercurrent heat exchanger from said holding tank, means for passing cool feed liquid to said heater through said heat exchanger in countercurrent heat exchange relationship with said waste liquid and then to said liquid heater and means for discharging said waste liquid from said heat exchanger after said heat exchange, comprising:

housing means enclosing said heat exchanger and said holding tank, with said holding tank and a laterally adjacent elongated outlet area below said heat exchanger, said outlet area having an outlet for discharge of waste liquid;

inlet means for said pump extending to a lower portion of said holding tank;

elongated upright baffle means separating said holding tank from said outlet area, whereby said holding tank may overflow into said outlet area;

said heat exchanger having upright spiral coils for waste liquid and feed liquid in adjacent relationship;

first conduit means connecting said pump with the upper ends of said waste liquid coils;

second conduit means for transferring waste liquid from the lower end of said waste liquid coils to said outlet area;

third conduit means for supplying the lower ends of said feed liquid coils with cool feed liquid;

fourth conduit means for transferring preheated feed liquid from the upper ends of said feed liquid coils to said heater; and means for controlling the operation of said pump to start said pump at a time corresponding generally to the flow of heated liquid from said heater to said device.

* * * * *